United States Patent [19]
Harrow

[11] Patent Number: 5,149,979
[45] Date of Patent: Sep. 22, 1992

[54] SAGGER LOADING APPARATUS AND A METHOD OF LOADING A SAGGER

[76] Inventor: George A. Harrow, 4 Rhyd-yr-Helyg, Swansea, United Kingdom

[21] Appl. No.: 566,420

[22] PCT Filed: Apr. 18, 1989

[86] PCT No.: PCT/GB89/00405
§ 371 Date: Aug. 30, 1990
§ 102(e) Date: Aug. 30, 1990

[87] PCT Pub. No.: WO89/10525
PCT Pub. Date: Nov. 2, 1989

[30] Foreign Application Priority Data
Apr. 18, 1988 [GB] United Kingdom ............... 8809124
Sep. 13, 1988 [GB] United Kingdom ............... 8821421

[51] Int. Cl.⁵ .................. G01N 21/86; G01N 9/04
[52] U.S. Cl. ................. 250/561; 250/223 R; 414/752
[58] Field of Search ............. 250/223 R, 223 B, 560, 250/561; 356/376, 379, 383–385; 414/732, 733, 752

[56] References Cited

U.S. PATENT DOCUMENTS

| | | | |
|---|---|---|---|
| 4,088,411 | 5/1978 | Ahlquist et al. | 356/383 |
| 4,365,705 | 12/1982 | Zinck et al. | 414/792.6 |
| 4,553,375 | 11/1985 | De Santis | 414/752 |
| 4,569,183 | 2/1986 | De Santis | 414/752 |

Primary Examiner—David C. Nelms
Assistant Examiner—S. Allen
Attorney, Agent, or Firm—David P. Gordon

[57] ABSTRACT

Sagger loading apparatus, for loading unfired ceramic sparking plug bodies (3) into a sagger (37), includes a clamp (8) for removing the bodies from a conveyor (2) and depositing the bodies on pins (14) in an array, which form an intermediate store. A gripper assembly having four inwardly and outwardly movable walls (22) grips the bodies on the pins and removes them and moves them simultaneously into the sagger, where the walls of the gripper are moved apart to leave the sparking plug bodies in the sagger, ready for firing.

34 Claims, 5 Drawing Sheets

SAGGER LOADING APPARATUS AND A METHOD OF LOADING A SAGGER

This invention relates to sagger loading apparatus and a method of loading a sagger with unfired ceramic bodies, such as "green" sparking plugs.

Sparking plug bodies are made from a mixture of ceramic material and wax by pressing quantities of the mixture in an isostatic press and then grinding all over the bodies so formed. At this stage, before firing, the bodies are very delicate, being easily broken, scratched or indented, but the material of any damaged bodies can be re-used if they can be isolated before firing.

The plug bodies are typically produced in families of different main body dimensions. Each family has about 30 different plugs, the differences being mainly in body length. The only common dimensions of all plugs is the diameter of the center axial hole therethrough.

Saggers are open-topped containers which are to be loaded with such unfired ceramic bodies for feeding to a furnace in which the bodies are to be fired. Saggers are generally made of porcelain; by virtue of that construction and the damage they sustain in use, they have large dimensional tolerances and are very rough inside and out.

At the present the unfired bodies, after grinding, pass along a conveyor to a position at which they are hand loaded into a sagger, typically 112 or more large plugs, or 175 small ones, per sagger. The hand loading results in many scrapes and bumps through contact with the sagger sides and base and these damaged bodies are undetected, so that after firing they are scrap.

It is one object of the present invention to reduce the quantity of scrap plug bodies.

According to one aspect of the invention there is provided sagger loading apparatus including an intermediate store, a first transfer means for taking unfired ceramic bodies in succession to the intermediate store, and second transfer means to remove simultaneously a plurality of said bodies from the intermediate store and deposit said bodies into a sagger.

According to another aspect of the invention there is provided sagger loading apparatus including an array of locators, a first transfer means for taking unfired ceramic bodies in succession each to one of the locators in the array, to be located thereby, and second transfer means to remove simultaneously a plurality of said bodies located by the array therefrom and deposit said bodies into said sagger.

The present invention further comprises a method of loading unfired ceramic sparking plug bodies into a sagger, including the steps of operating a first transfer means to transfer the bodies in succession each to one of an array of locators, then operating a second transfer means to remove simultaneously a plurality of the bodies from the array and to deposit the bodies into the sagger.

Preferably, measuring equipment is provided to check at least one dimension of each body before it is taken by the first transfer means. The dimension may be the major axial length of the body, so as to detect bodies of which a length is broken off. The measuring equipment conveniently includes a radiation beam source and a radiation detector between which source and detector the body passes, interruption of the beam thereby signalling the position of one or other end of the body. The radiation may be optical wavelength or infra-red.

The radiation detector preferably has a narrow receiving aperture which is adjustable either by varying the diameter of a circular aperture or by varying the width of crossed adjustable windows.

There may be a first radiation beam source and a first radiation detector between which each body passes, and then a second radiation beam source and a second radiation detector between which each body passes, so as to detect both ends of the body simultaneously. To accommodate different sizes of bodies the spacing between the two beams of radiation may be adjustable. Furthermore, to accommodate bodies having different dimensions normal to the dimension being checked, the or each radiation beam source and detector may be adjustable in a direction normal to said length. The spacing between the two beams of radiation may be adjusted by a fine pitch lead screw driven by a stepping motor.

Preferably the positional adjustments of the measuring equipment are made automatically by control equipment, which may operate in dependence on information supplied thereto identifying the type of body, such as a part number.

Where there are only two of the different dimensions normal to the dimension being checked, the or each radiation beam source and detector may be moved by a short stroke pneumatic ram.

Conveniently, a conveyor is provided to bring the body to the first transfer means. Preferably alignment guides above the conveyor move the succession of the bodies on the conveyor into a row before they reach the measuring equipment and/or the first transfer means. Advantageously, the major axes of the bodies may be aligned parallel by the guides.

The first transfer means may take each body from the conveyor in a direction normal to the direction of conveyor travel, whereby debris will be conveyed away by the conveyor. The first transfer means preferably takes from the conveyor only bodies which the measuring equipment has detected as being dimensionally acceptable.

In order to take each body to one of the locators, the first transfer means and/or the array of locators may be indexed along. The second transfer means may include at least two gripper members, movable towards each other to grip the bodies in the array and remove them to the sagger. The gripper members may be shaped to fit the bodies and may comprise gripping walls. Preferably the gripper member has four walls movable inwardly to grip the bodies.

Where the bodies are formed with a hole therethrough, each locator may be a pin onto which a body is fed, with the pin in the hole. A buffer may be provided at the base of each pin, to cushion the body as it becomes fully located on the pin.

Conveniently a plate is movable along the pins, from the bases towards the tips thereof, to push the bodies off the pins, when within the gripper members.

Advantageously, two or more arrays of locators are provided, movable successively between positions in which one array is being loaded while the other array is being unloaded.

Preferably the sagger is positioned with an opening to one side, through which opening the second transfer means holding the bodies can be introduced in a horizontal direction and from which the second transfer means can be removed after releasing the bodies in the sagger, which is then rotated until the opening is at the top. An ejector may be provided to hold the bodies in the sagger as the second transfer means is removed therefrom.

One embodiment of the invention is described, by way of example only, with reference to the accompanying drawings, in which.

Figure 1:
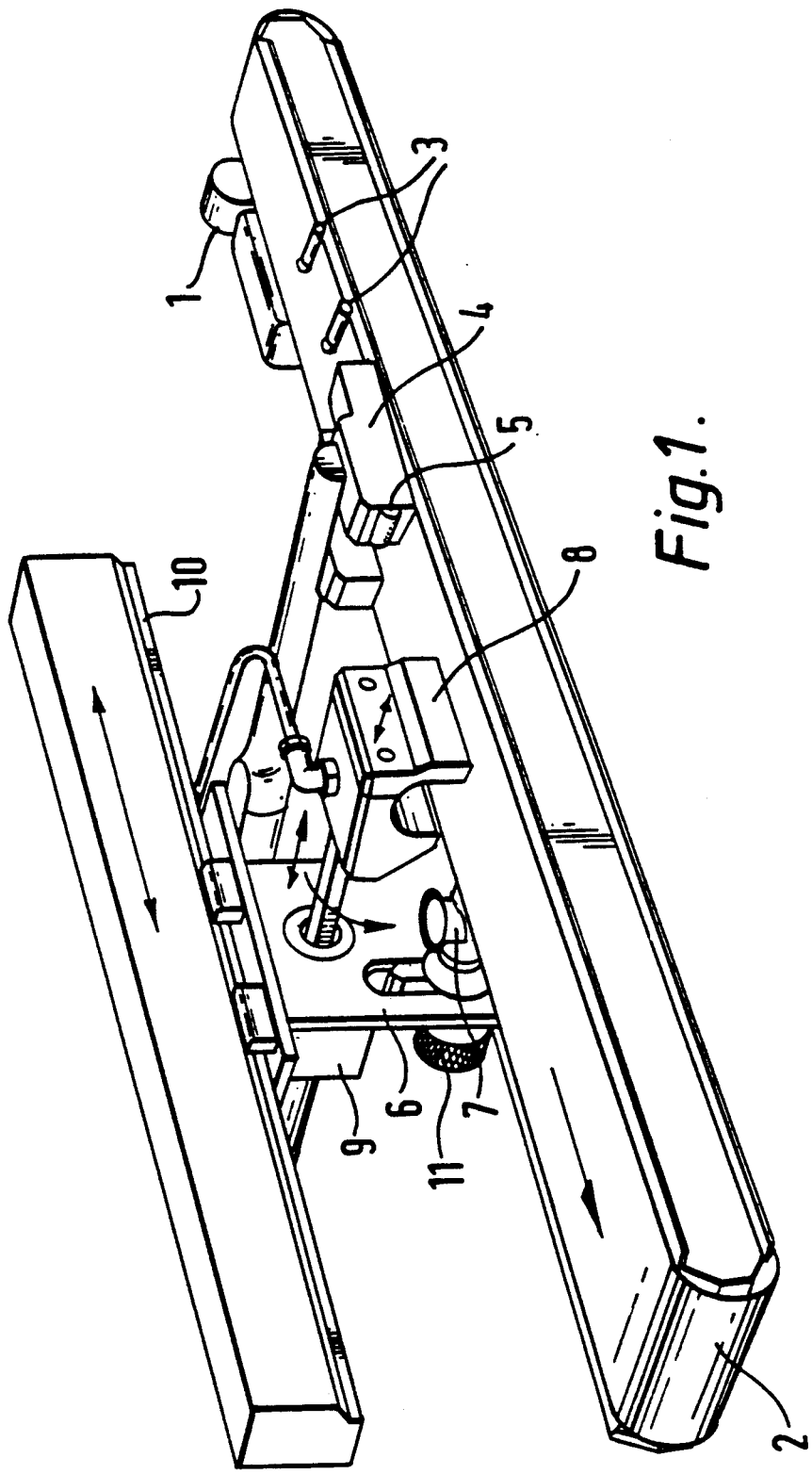
FIG. 1 is a perspective view of part of apparatus for loading unfired ceramic sparking plug bodies into a sagger, according to the invention.

In the arrangement shown in the drawings, a motor 1 drives a belt conveyor 2 onto which unfired ceramic sparking plug bodies are deposited, after they have been isostatically pressed and ground all over.

Convergent guides (not shown) above the conveyor 2 move the sparking plug bodies into a single line with the central long axes of the bodies parallel and substantially in line. The bodies then pass in front of a pair of photocells 3, which receive light from unshown sources (preferably infra-red) shining straight across the conveyor 2. The receiving apertures of the photocells 3 may be adjustable to achieve optimum accuracy. The aperture are of adjustable circular form or of crossed adjustable rectangular windows.

The photocells 3 are used to check the axial length of the body on the conveyor 2, one photocell being cut off by the leading edge of the body just as the other photocell is cut off by the trailing edge of the body. Lack of simultaneous cut-off indicates a too short body, which must therefore be broken and rejected and the material recycled.

Since plug bodies of one production batch will differ in length from another batch, the photocells 3 are movable apart by a fine lead screw driven by a stepping motor, controlled for example by a computer into which part numbers of the sparking plugs are entered.

The bodies of one family of plugs are of different diameter from those of the other family, so that the central axis height will be different. Thus, the photo cells 3, and the light sources if necessary, are raised and lowered between two positions by a short stroke pneumatic cylinder, also controlled by the computer.

The bodies then pass through another tapered channel 4 and are detected by a timing switch 5. The computer allows for the speed of the conveyor 2 or the number of steps of the motor 1 to close a pneumatically operated clamp 8 as the body arrives. When closed on the body, the clamp 8 is moved sideways across and off the conveyor 2 by a pneumatic ram 9 which then rotates the clamp 8 through 90°, until the long axis of the sparking plug body is vertical. The clamp 8 is then opened, to release the body to fall through a guide or tube 7, which is adjustable by a locking nut 11.

Any debris of unfired ceramic material remaining on the conveyor 2 continues and is collected at the end for re-use. The channel 4, timing switch 5, clamp 8, tube 7 and associated components are all mounted on a track 10, with movement being controlled by the computer.

Figure 2:
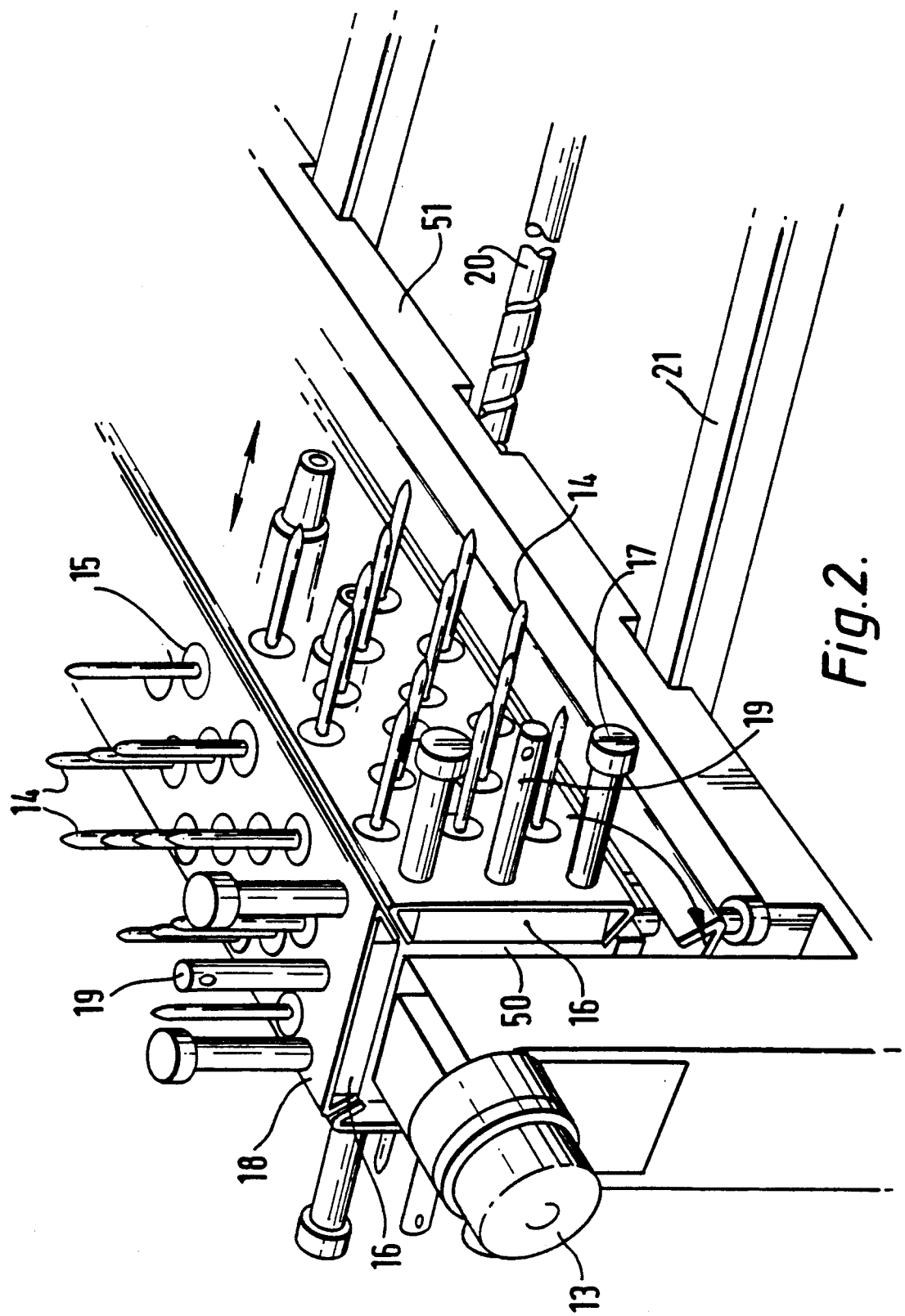
FIG. 2 is a perspective view at enlarged scale of apparatus to be used with the apparatus of FIG. 1.

In FIG. 2, a block 50 of square cross-section, is carried on a cradle 51 and rotatable in 90° steps about the long axis of the block 50 by a motor 13. The four sides of the block 50 carry plates 16 into which are fastened the ends of an array of rows and columns of pins 14, tapered at their free ends. Elastomeric washers 15 surround each pin 14 and are fixed in outer plates 18. The washers 15 cushion the fall of the sparking plug bodies as they come down the guide 7 and onto the pins 14. The top of the upper pins 14 are below the level of the guide 7.

The cradle 51 is movable along a track 21 by a lead screw 20 controlled by the computer. The track 21 is at right angles to, and extends laterally from, the conveyor 2. The assembly carried by the track 10 is indexed stepwise, to drop a plug body onto each pin 14 in one row in turn. The lead screw 20 then moves the cradle 51 one step, to bring the guide 7 into line with the next row of pins 14.

After all the upwardly pointing pins 14 are loaded with a plug body, the block 50 moves backwards away from the gripper as it rotates through 90° so that the loaded pins 14 point away from the conveyor 2. The next consignment of pins 14 then comes into position and commences loading.

Figure 3:
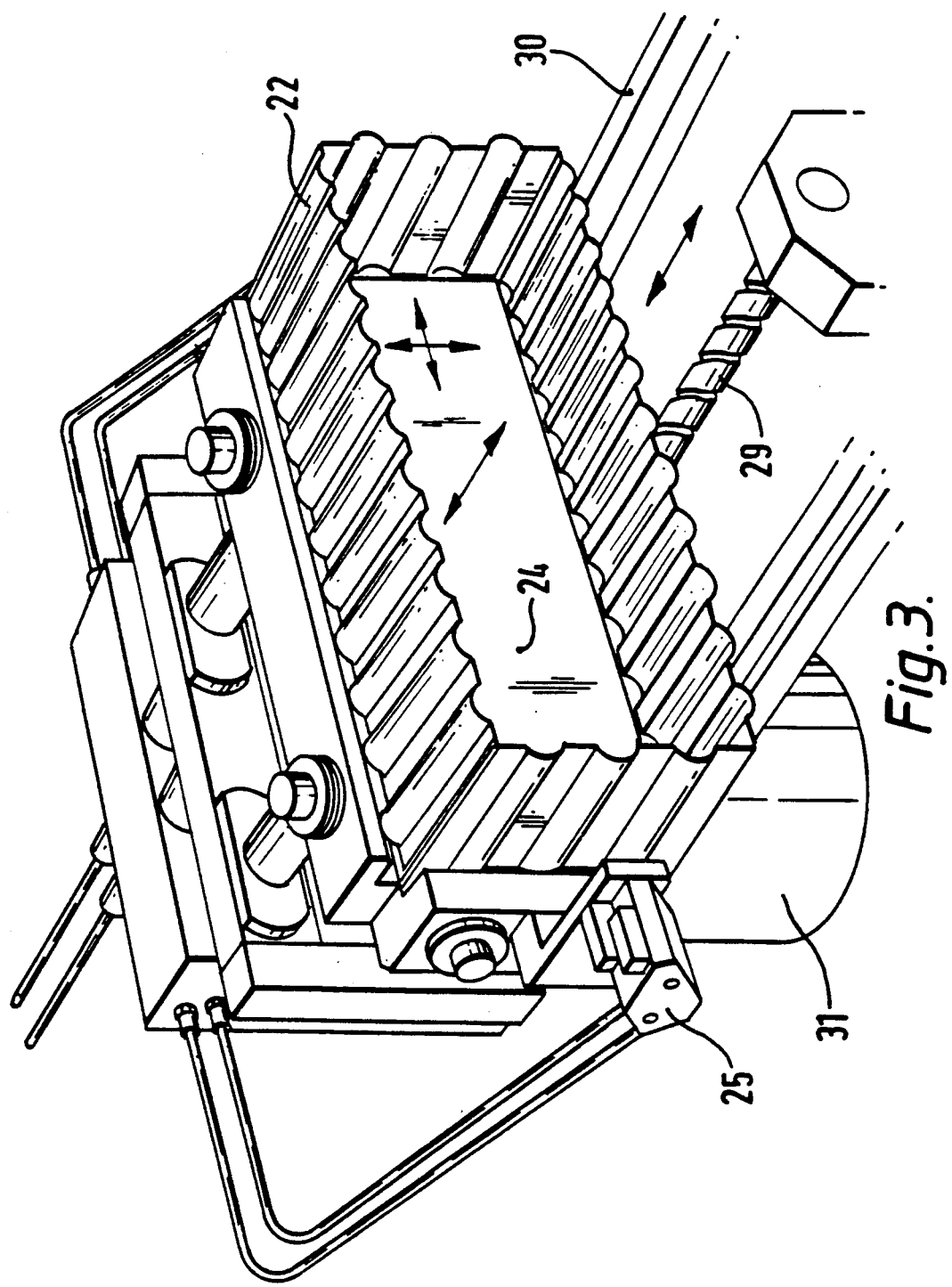
FIG. 3 is a perspective view of apparatus to be used with the apparatus of FIG. 2.
Figure 4:
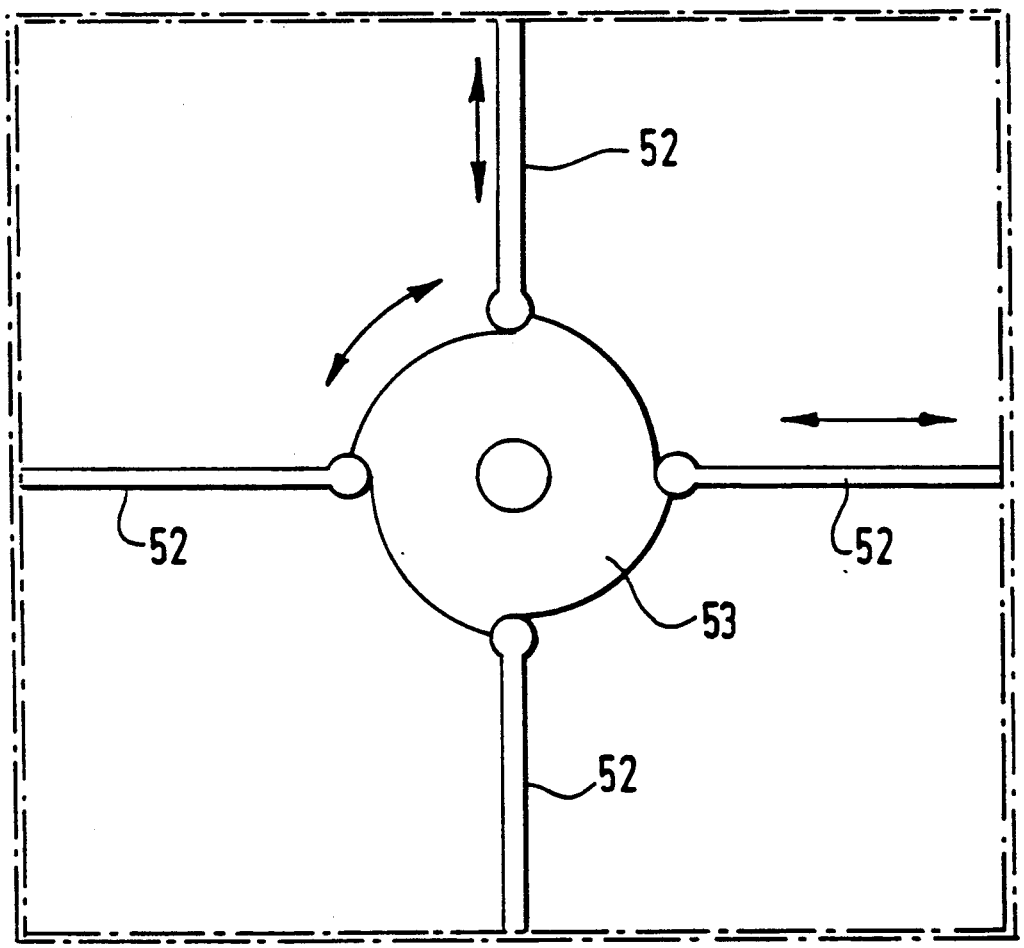
FIG. 4 is a plan of part of the apparatus of FIG. 3.

Referring to FIG. 3, a track 30 is aligned with or parallel to the track 21 in FIG. 2, and a screw 29 moves a frame along the track 30, the frame carrying a gripper assembly which is rotatable on the frame about a vertical axis by a motor 31. The gripper assembly includes four relatively movable corrugated walls 22 each fastened to one of the rods 52 (in FIG. 4) which move the walls 22 towards or away from each other when a motorised 4 lobed cam 53 is rotated.

With the gripper assembly facing the loaded pins 14 and the walls 22 spaced outwardly, the screw 20 advances the cradle 51 until the walls 22 surround the bodies on the pins 14, the peripheral bodies fitting in the corrugations of the walls 22. Pneumatic rams 25 at each end of the gripper assembly lock onto rods 19 fastened to the outer plates 18.

The cam 53 is rotated until the walls 22 touch the bodies lightly (to avoid crushing the bodies on the pins); the assembly on the cradle 51 is then retracted along the track 21. The rods 19 draw the plate 18 and washers 15 along the pins 14 until the bodies are off the pins 14. The cam 53 then rotates to lock the bodies together, and the rams 25 then unlock the rods 19. The plates 18 carry stops 17, as the cradle 51 returns along the track 21 the stops 17 on the opposite side to the pins 14 which have just been unloaded, reach abutments which cause the stops 17 to push the plate 18 (nearest the conveyor 2) back to the plate 16, ready for loading later.

Figure 5:
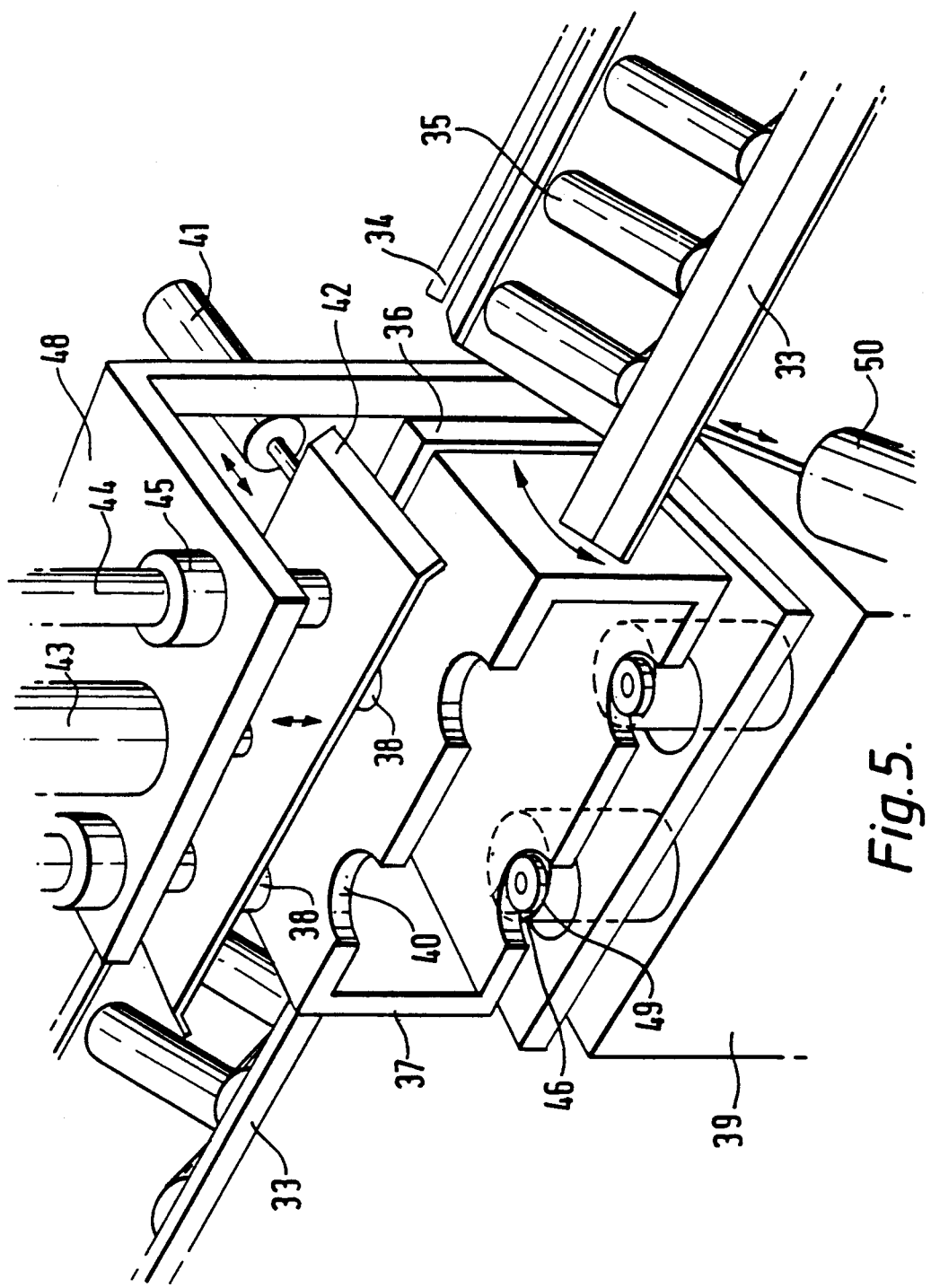
FIG. 5 is a perspective view of apparatus to be used with the apparatus of FIG. 3.

FIG. 5 shows a sagger 37 which is transported along a conveyor 33 having powered rollers 35. A section 36 of the conveyor 33 is tiltable until the open side of the sagger 37 faces towards, and is aligned with, the gripper assembly, after the latter has been turned through 90° after gripping the sparking plug bodies. The sagger is located by location stops 49 eccentrically mounted on bosses 46 and downwardly movable pillar stops 38, which locate in depressions 40 in the sagger wall. The pillar stops 38 are located to a clamp plate 42 which is driven down by a piston 43. The plate is guided by pillars and bushes 44, 45. Two pistons 41 force sagger 37 against location stops 49 and onto bosses 46 by means of rotating piston 50.

The gripper assembly is then advanced by the screw 29 along the track 30 until the walls 22 containing the bodies are positioned within the sagger 37. The walls 22 are then moved apart to release the grip on the bodies and the gripper assembly is withdrawn by the screw 29 back to its loading position. Meanwhile a plate 24 in the end of the gripper assembly is pushed by a pneumatic ram towards the open end of the gripper assembly, so that the bodies are left in the sagger 37 as the walls 22 are drawn out of it. Finally, the plate 24 is retracted, the gripper assembly rotated by the motor 31 through half a turn ready for re-filling, the upper stops 38 are withdrawn and the conveyor section 36 is aligned with the furnace for firing. If required, the closure of the walls 22 can be done in a two-stage operation, so as to minimise damage to the bodies therein.

Detector switches may be provided at each end of the tube 7, to switch off the machine if a component has not dropped right through the tube 7.

The unloading of the gripper assembly into the sagger 37 and return of the gripper assembly for re-filling takes place while the next set of upwardly-pointing pins 14 are being filled. All the timed movements and events are controlled by the computer to ensure minimum delays, allow for different sizes and types of product being handled and to minimise scrap products.

Since the saggers 37 vary in dimensions, it may be necessary to provide a more accurate location than is provided by the conveyor section 36 and the stops 38 and 39. This can be achieved by using transducers, such as linear variable differential transformer types, to detect the internal surfaces of the sagger and to actuate sagger positioning actuators through a feedback system.

Although the invention has been described with reference to loading unfired ceramic sparking plug bodies into a sagger, it could be used for loading other suitable unfired ceramic articles into a sagger. For some such bodies, more sophisticated flaw or breakage detection may be required, for which purpose a laser profiling system may be used. Instead of the clamp 8 a suction cup may be usable for some types of product.

I claim:

1. Apparatus for loading a sagger with a plurality of unfired ceramic bodies, which apparatus comprises:
   (a) at least one array of pins arranged such that each said pin can receive a respective one of said bodies;
   (b) first transfer means for taking said unfired ceramic bodies individually and in succession each to one of said pins in said array to be located thereby; and
   (c) second transfer means for simultaneously removing a plurality of said bodies located on said array of pins, and for subsequently depositing said bodies into said sagger.

2. Apparatus according to claim 1, in which the second transfer means is adapted to remove simultaneously all said plurality of bodies located on the array of pins.

3. Apparatus according to claim 1, which further includes means for indexing along the first transfer means and/or the array of pins.

4. Apparatus according to claim 1, which further comprises buffer means provided at the base of each pin, arranged to cushion the respective body as it becomes fully located by the pin.

5. Apparatus according to claim 1, which further includes a plate movable along the pins from the bases towards the tips thereof, to push said bodies off the pins, when said bodies are located within said second transfer means.

6. Apparatus according to claim 1, which includes two or more of said arrays of pins, said arrays being movable successively between positions in which one array can be loaded by said first transfer means while the other array is being unloaded by said second transfer means.

7. Apparatus according to claim 1, in which said second transfer means includes at least two gripper members which are movable towards each other to grip said bodies in the array and remove them to the sagger.

8. Apparatus according to claim 7, in which said gripper members are shaped to fit the shape of said plurality of bodies.

9. Apparatus according to claim 8, in which the gripper members comprise four walls movable inwardly to grip said bodies, and outwardly to release them.

10. Apparatus according to claim 1, in which the second transfer means holding said bodies is arranged to be introduced in a horizontal direction into a sagger positioned with an opening to one side, from which opening the second transfer means can be removed after releasing said bodies into the sagger.

11. Apparatus according to claim 10, which further comprises means for holding said bodies in the sagger as the second transfer means is removed therefrom.

12. Apparatus according to claim 1, which further comprises monitoring means for monitoring at least one dimension of each said body before the latter is taken by the first transfer means.

13. Apparatus according to claim 12, in which the monitoring means includes at least one radiation beam source and at least one radiation detector between a pair of which source and detector said body may pass, interruption of a respective beam thereby signalling the position of one or the other end of said body.

14. Apparatus according to claim 12, in which the dimension monitored is the major axial length of said body.

15. Apparatus according to claim 14, in which there are only two of the different dimensions normal to the dimension being monitored, said apparatus including a short stroke pneumatic ram to move the radiation beam source and the detector.

16. Apparatus according to claim 1, which further includes a conveyor arranged to bring said bodies to said first transfer means.

17. Apparatus according to claim 16, which further includes alignment guides above the conveyor to move the succession of said bodies on the conveyor into a row before they reach the first transfer means, said guides being such that the major axes of said bodies are aligned parallel thereby.

18. Apparatus according to claim 16, in which said first transfer means is adapted to take each body from the conveyor in a direction normal to the direction of the conveyor travel, whereby debris will be conveyed away by the conveyor.

19. Apparatus according to claim 16, which comprises a first radiation beam source and a first radiation detector between which each said body may pass, and a second radiation beam source and a second radiation detector between which each said body may pass, so as to permit detection of both ends of said body simultaneously.

20. Sagger loading apparatus according to claim 19, in which the spacing between the two beams of radiation is adjustable, to accommodate different sizes of said bodies.

21. Sagger loading apparatus according to claim 19, in which the first transfer means is arranged to take from the conveyor only bodies which are detected as being dimensionally acceptable.

22. Sagger loading apparatus including an array of locators, a first transfer means for taking unfired ceramic bodies in succession each to one of the locators in the array, to be located thereby, and second transfer means including at least two gripper members which are movable towards each other to grip a plurality of said bodies located by the array and remove them simultaneously to the sagger.

23. Sagger loading apparatus according to claim 22, in which the gripper members are shaped to fit the shape of said plurality of bodies located by the array.

24. Sagger loading apparatus according to claim 22, in which the gripper members are adapted to remove simultaneously all said bodies located by the array.

25. Sagger loading apparatus according to claim 24, in which the gripper members comprise four walls movable inwardly to grip said bodies and outwardly to release them.

26. Sagger loading apparatus according to claim 24, in which the sagger is positioned with an opening to one side, through which opening the second transfer means holding said bodies can be introduced in a horizontal direction and from which the second transfer means can be removed after releasing said bodies into the sagger, which can then be rotated until the opening is at the top.

27. Sagger loading apparatus according to claim 26, which further includes an ejector to hold said bodies in the sagger as the second transfer means is removed therefrom.

28. Sagger loading apparatus according to claim 24, in which monitoring means is provided to check at least one dimension of each said body before it is taken by the first transfer means.

29. Sagger loading apparatus according to claim 28, in which the monitoring means includes at least one radiation beam source and at least one radiation detector between each of which source and detector said body passes, interruption of a respective beam thereby signalling the position of one or the other end of the body.

30. Sagger loading apparatus according to claim 29, in which the or each radiation beam source and detector is adjustable in a direction normal to said length, to accommodate bodies having different dimensions normal to the dimension being checked.

31. Sagger loading apparatus according to claim 28, which further includes a conveyor to bring said bodies to the first transfer means.

32. Sagger loading apparatus according to claim 31 which further includes alignment guides above the conveyor to move the succession of said bodies on the conveyor into a row before they reach the measuring means and/or the first transfer means, said guides being such that the major axis of said bodies are aligned parallel thereby.

33. Sagger loading apparatus according to claim 32, in which the first transfer means is adapted to take each body from the conveyor in a direction normal to the direction of conveyor travel, whereby debris will be conveyed away by the conveyor.

34. A method of loading unfired ceramic bodies into a sagger, including the steps of operating a first transfer means to transfer the bodies in succession each to one of an array of pins, then operating a second transfer means to remove simultaneously a plurality of the bodies from the array and to deposit the bodies into the sagger.

* * * * *